(12) United States Patent
Skarpness

(10) Patent No.: US 7,200,156 B2
(45) Date of Patent: Apr. 3, 2007

(54) MODULAR BROADBAND ADAPTER SYSTEM

(76) Inventor: Mark L. Skarpness, 913 NE. 3rd Ave., Hillsboro, OR (US) 97124

( * ) Notice: Subject to any disclaimer, the term of this patent is extended or adjusted under 35 U.S.C. 154(b) by 0 days.

(21) Appl. No.: 10/871,976

(22) Filed: Jun. 18, 2004

(65) Prior Publication Data
US 2004/0228361 A1 Nov. 18, 2004

Related U.S. Application Data

(62) Division of application No. 09/469,987, filed on Dec. 21, 1999.

(51) Int. Cl.
H04J 1/00 (2006.01)
(52) U.S. Cl. .................. 370/480; 379/93.09
(58) Field of Classification Search ........... 370/352, 370/355, 356, 389, 392, 493–495, 463; 379/93.01, 379/93.05, 93.09, 399.01; 713/201
See application file for complete search history.

(56) References Cited

U.S. PATENT DOCUMENTS

| 5,297,194 | A | 3/1994 | Hunt et al. |
|---|---|---|---|
| 5,333,266 | A | 7/1994 | Boaz et al. |
| 5,475,738 | A | 12/1995 | Penzias |
| 5,764,731 | A | 6/1998 | Yablon |
| 5,838,682 | A | 11/1998 | Dekelbaum et al. |
| 5,889,856 | A * | 3/1999 | O'Toole et al. ............. 370/480 |
| 5,892,764 | A | 4/1999 | Riemann et al. |
| 5,940,479 | A | 8/1999 | Guy et al. |
| 5,950,167 | A | 9/1999 | Yaker |
| 5,956,323 | A | 9/1999 | Bowie |
| 5,999,612 | A | 12/1999 | Dunn et al. |
| 6,061,450 | A | 5/2000 | Bauer |
| 6,075,784 | A | 6/2000 | Frankel et al. |
| 6,088,430 | A | 7/2000 | McHale |
| 6,118,768 | A | 9/2000 | Bhatia et al. |
| 6,131,095 | A | 10/2000 | Low et al. |
| 6,175,565 | B1 | 1/2001 | McKinnon et al. |
| 6,208,637 | B1 | 3/2001 | Eames |
| 6,215,863 | B1 | 4/2001 | Bennett, III et al. |
| 6,272,219 | B1 | 8/2001 | De Bruycker et al. |
| 6,272,553 | B2 | 8/2001 | Way et al. |
| 6,345,072 | B1 * | 2/2002 | Liu et al. .................... 370/501 |
| 6,346,964 | B1 | 2/2002 | Rogers et al. |
| 6,347,075 | B1 | 2/2002 | Barzegar et al. |
| 6,414,952 | B2 | 7/2002 | Foley |
| 6,430,199 | B1 | 8/2002 | Kerpez |
| 6,442,248 | B1 * | 8/2002 | Davis ..................... 379/93.02 |
| 6,445,694 | B1 | 9/2002 | Swartz |
| 6,453,040 | B1 | 9/2002 | Burke et al. |

(Continued)

Primary Examiner—Doris H. To
Assistant Examiner—Phuongchau Ba Nguyen
(74) Attorney, Agent, or Firm—Molly A. McCall

(57) ABSTRACT

A system which allows modular expansion to provide additional services to high speed data. A high speed data line such as DSL or cable is input to a broadband expandable modem device. The modem device produces an output indicative of the data within the data stream. An expansion output is indicative of voice within the data stream which is separated from the data. The expansion output is coupled to one of a plurality of voice adapters. Each of the voice adapters is expandable so daisy chain communication is possible to add additional layers of voice by simply acquiring additional voice adapters. The system preferably uses USB for the expansion capability.

8 Claims, 2 Drawing Sheets

U.S. PATENT DOCUMENTS

| | | | |
|---|---|---|---|
| 6,470,046 B1 * | 10/2002 | Scott | 379/93.08 |
| 6,510,152 B1 | 1/2003 | Gerszberg et al. | |
| 6,526,581 B1 | 2/2003 | Edson | |
| 6,532,280 B1 * | 3/2003 | McDonald | 379/93.08 |
| 6,560,222 B1 | 5/2003 | Pounds et al. | |
| 6,570,974 B1 * | 5/2003 | Gerszberg et al. | 379/218.01 |
| 6,597,687 B1 * | 7/2003 | Rao | 370/352 |
| 6,621,831 B1 * | 9/2003 | Linz | 370/480 |
| 6,643,780 B1 * | 11/2003 | Cooper | 713/201 |
| 6,728,239 B1 * | 4/2004 | Kung et al. | 370/352 |
| 6,778,662 B1 * | 8/2004 | DeLaine, Jr. | 379/93.09 |
| 6,813,343 B1 * | 11/2004 | Vitenberg | 379/93.05 |
| 6,826,612 B1 * | 11/2004 | Bosloy et al. | 709/227 |
| 2002/0067811 A1 * | 6/2002 | Matsumoto | 379/93.08 |

* cited by examiner

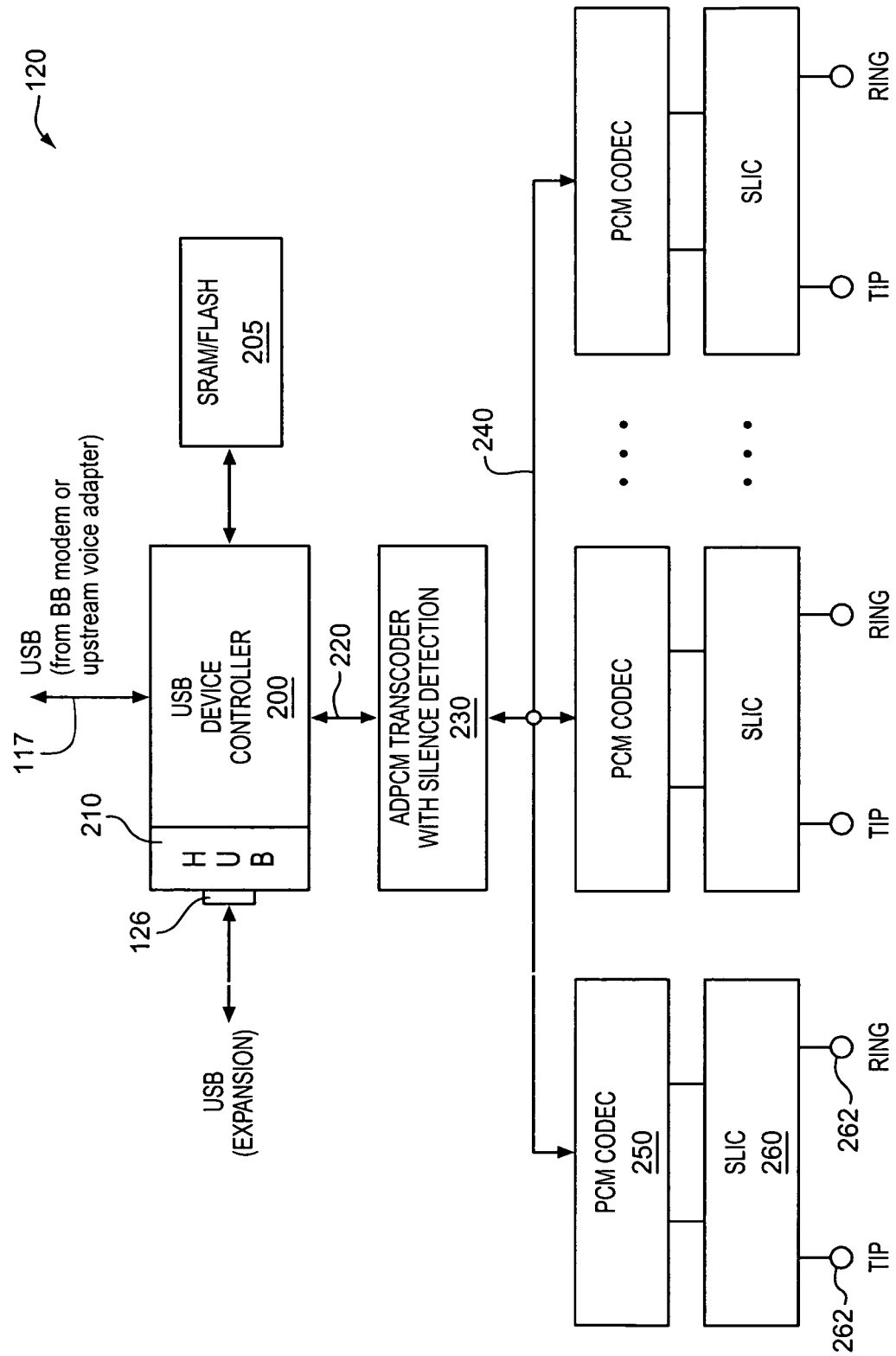

MODULAR BROADBAND ADAPTER SYSTEM

This is a divisional of U.S. application Ser. No. 09/469,987, filed on Dec. 21, 1999, and priority is claimed thereto.

BACKGROUND

The present application describes broadband access and uses for a high bandwidth line.

Modern internet access allows increased bandwidth capability. For example, cable modems, Digital Subscriber Line ("DSL") and other similar "broadband" internet services provide more bandwidth than is needed during an average user's web browsing.

The extra bandwidth can be used for other purposes. For example, various systems including voice-over-DSL and voice-over-cable allow a user to encode their voice on the same system that carries the data.

SUMMARY

The present application describes an integrated access device which is modular, expandable, and allows connection of multiple services over the broadband data connection.

The present application describes a modular communication system, that has a first communication device, having a first port which allows receiving broadband data, an expansion port which provides output data to allow adding additional data-receiving elements thereto, and a first electronic element which analyzes the broadband data and separates data information from voice information therein and couples the voice information to the expansion port.

BRIEF DESCRIPTION OF THE DRAWINGS

These and other aspects will now be described in detail with respect to the accompanying drawings, wherein:

FIG. 2 shows a block diagram of the voice adapter portion.

DETAILED DESCRIPTION

Figure 1:
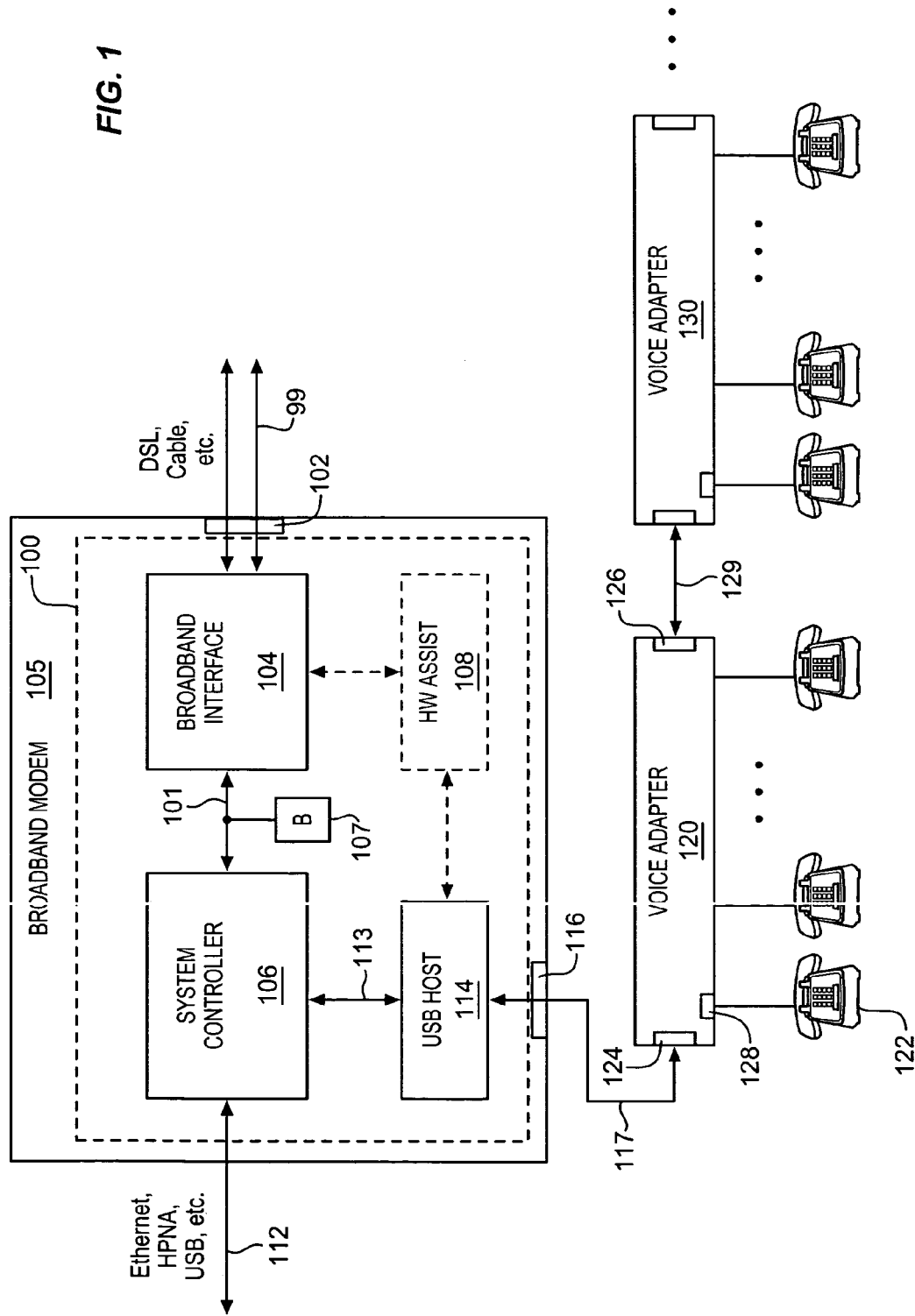
FIG. 1 shows a basic block diagram of the overall system.

The present disclosure defines a number of modular and expandable devices, 100, 120, 130. Each device is formed within a housing, and each device includes an expansion port. Each of the expansion ports includes a signal that carries the excess information, i.e., any information that is not processed and/or used by the electronics within the housing. The expansion port includes a connection, and the information on the connection allows connecting to an additional modular and expandable device.

The primary device is the basic modem device 100. This device is contained within housing 105, which can be a stand alone housing cabinet, a circuit card, or even the packaging for a chip such as an application specific integrated circuit or ASIC. The perimeter of housing 105 a data port 102 which is connected to a high bandwidth information stream such as a broadband data source 99, e.g. a DSL line, cable or the like, and an expansion port 116.

The data from the broadband source 99 is coupled to a broadband interface 104. This can be a commercially available modem chip or a digital signal processor (DSP) configured for broadband access.

The broadband interface feeds a first electronic element 100, which can include a processor or a microcontroller. The controller analyzes the information output 101 from the broadband interface 104. This information output 101 may include both data portions 112 as well as embedded voice streams 113. The data 112 is separated from the embedded voice streams 113. Only the data portion 112 is used by the modem unit 100, so all other portions, including the voice streams 113 is routed to the expansion port 116. A Universal Serial Bus (USB) host 114 formats the information and makes it available at expansion port 116. This information is intended to be coupled to Telephony adapters as described herein. Cost effective expansion therefore becomes quite practical.

An optional hardware assister 108 can be a digital signal processor, a floating point unit, or another device which can increase throughput of information. A buffer element 107 can also be provided, for temporary storage as needed.

As described above, the system controller 106 acts on the information stream from the broadband data line 99 to separate the information stream into a data output 112 and voice streams part 113. The data output 112 is formatted into a specified protocol, e.g. Ethernet 7M and output as formatted output data 112. The Ethernet data can be used over a local area network providing Internet access, for example.

Data output 112 can alternately be in another standard network form such as universal serial bus (USB) or the like.

The voice part 113 from system controller 106 is coupled to a USB adapter 114 which drives a USB output via expansion port 116. Expansion port 116 can be used to communicate with one or more additional modular devices.

The system block diagram of FIG. 1 shows first and second separate voice adapter devices 120 and 130, respectively. Each voice adaptor device can connect to a plurality of different telephone handsets, e.g. 122. Each voice adapter such as 120, includes an input expansion jack 124 that receives the input representing the information that was not used and output by modem 100. An output expansion jack 126 is used to pass information that is not used by the adapter 120. This excess information 129 can be sent to an output port for another expansion unit.

At least one RJ11 jack 128 can be provided on expansion unit 120 for connection to a telephone and/or additional telephone electronics. Alternately, the connection to the telephone handsets can use some other connector form, or a wireless connection such as by Bluetooth™, using the Bluetooth 1.0 specification, Jul. 26, 1999.

A detailed block diagram of the voice adapter 120 is shown in FIG. 2. An expansion line 117 from the broadband modem 100, including the information 116, is input to USB device controller 200. The information input could also be from an upstream voice adapter.

The USB device controller 200 has an associated memory device 205 such as a static RAM or flash memory which includes operating information for USB device controller 200, as well as the ability to update USB parameters/protocol via downloading to a flash memory. USB device controller 200 also includes a hub portion 210 which controls communication with other USB expansion devices over the expansion slot 126. The information in memory device 205, for example, can include a list of telephone numbers that are to be serviced by the specific voice adapter. Device controller 200 then separates the information associated with those specific telephone numbers as its data output 220. All remaining information is possibly reformatted, and output on the expansion port 126.

The data output 220 from the USB device controller is coupled to an information separator a pulse code modulated (PCM) transcoder 230 (or similar voice codec) for compression/decinoression, e.g. for bandwidth reduction. The system should retain compatibility, however, with standard 64K bit (PCM) data, to enable use of an analog modem connected to one of the voice adapter ports.

ADPCM transcoder 230 compresses/uncompresses and separates the information as 240. Each of the separated data streams from 240 is coupled to a respective PCM codec 250, and subscriber line interface circuit Subscriber Line Interface Card (SLIC) 260. The SLIC provides standard "tip" and "ring" signals 262 which can be in any standard form. One form is an RJ11 jack. Another is a wireless transmission, e.g. over a part 15 frequency to a cordless phone receiver or via Bluetooth as described above.

According to the paradigm of this system, a service provider can provide a user with one of the modular devices, e.g. the broadband modem 100. The user can later be offered the opportunity to add additional telephone lines, each with a separate telephone number, without additional wiring. The additional numbers are obtained by programming the number into the memory device 205. The modem unit 100 recognizes the data information and separates it from the voice information that it does not process. The voice information is coupled to expansion port 116. Each voice adapter recognizes the telephone numbers associated with that voice adapter. Additional telephone lines are added by simply programming the new number into the memory device 205, if a port is available. If not, an additional voice adapter is connected to the expansion connector 126.

The service provider defines the additional telephone numbers. Any incoming voice call is multiplexed on the broadband data source 99, along with a code indication of the phone number. Each adapter recognizes its own numbers, and passes other numbers. Downstream adapters, added later on, recognize the additional numbers. No change needs to be made to the upstream adapters for these additional numbers, since each adapter passes any information that it is not programmed to accept.

The user can later add additional modems or other devices, as well as any desired number of voice adapters for any desired number of lines. The number of phones or services is limited only by bandwidth which may be limited by the slot that is broadband data source 99.

Other embodiments are with the disclosed embodiment. For example, while this describes the modular devices as being in separate housings, they can alternately be separate expansion cards in a backplane, or separate units that can be plugged in to a basic motherboard. For modularity, it is convenient if some portion of the units are separate. In addition, other expansion technologies, such as firewire and the like, can be used in place of USB.

What is claimed is:

1. A broadband modem for telephony and data communications, comprising:

a broadband interface circuit to couple to a broadband line, said broadband interface circuit to receive broadband data from the broadband line;

a system controller to couple to said broadband interface circuit, wherein said system controller to separate a data portion and telephony information from the broadband data, wherein only the data portion is to be used by the broadband modem;

a host controller to couple to said system controller; and an expansion port to couple to said host controller, wherein said expansion port to include a signal to carry the telephony information to a device controller of a peripheral device.

2. A broadband modem as claimed in claim 1, wherein said broadband interface circuit is a digital subscriber line interface circuit.

3. A broadband modem as claimed in claim 1, wherein said broadband interface circuit is a cable modem interface circuit.

4. A broadband modem as claimed in claim 1, wherein said host controller is configured to operate in compliance with one of a Universal Serial Bus standard, a Firewire standard, and a wireless communication standard.

5. A broadband modem for telephony and data communications, comprising:

a broadband interface circuit to couple to a broadband line, said broadband interface circuit to receive broadband data from the broadband line;

a system controller to couple to said broadband interface circuit, wherein said system controller to separate a data portion and telephony information from the broadband data, wherein only the data portion is to be used by the broadband modem;

a host controller to couple to said system controller; and an expansion port to couple to said host controller, wherein said expansion port to include a signal to carry the telephony information to a device controller of a peripheral device, said host controller being one of a Universal Serial Bus Controller, a Firewire controller, a Bluetooth controller, and a wireless controller.

6. A broadband modem as claimed in claim 5, wherein said system controller transfers data packets between said broadband intefface circuit and a local area network, and transfers the telephony information between said broadband interface circuit and said host controller.

7. A broadband modem as claimed in claim 5, wherein said broadband interface circuit is a digital subscriber line interface circuit.

8. A broadband modem as claimed in claim 5, wherein said broadband interface circuit is a cable modem interface circuit.

* * * * *